United States Patent [19]

Dumolo

[11] 4,209,428

[45] Jun. 24, 1980

[54] FOUNDRY BINDERS

[75] Inventor: David Dumolo, Dudley, England

[73] Assignee: Fordath Limited, West Bromwich, England

[21] Appl. No.: 836,924

[22] Filed: Sep. 26, 1977

[30] Foreign Application Priority Data

Jul. 21, 1977 [GB] United Kingdom ............... 30608/77

[51] Int. Cl.² ........................ C08G 18/06; C08K 5/10; C08L 91/00
[52] U.S. Cl. ............................ 260/18 TN; 260/31.4 R
[58] Field of Search .................. 260/18 TN, DIG. 40, 260/31.4 R

[56] References Cited

U.S. PATENT DOCUMENTS

| | | | |
|---|---|---|---|
| 2,374,136 | 4/1945 | Rothrork | 260/22 |
| 3,255,500 | 6/1966 | Engel et al. | 260/40 R |
| 3,403,721 | 10/1968 | Robins et al. | 260/DIG. 40 |
| 3,428,110 | 2/1969 | Walker et al. | 164/43 |
| 3,925,296 | 12/1975 | Stone et al. | 260/37N |
| 3,933,727 | 1/1976 | Schmid | 260/37 N |

*Primary Examiner*—Sandra M. Person
*Attorney, Agent, or Firm*—Sughrue, Rothwell, Mion, Zinn and Macpeak

[57] ABSTRACT

A foundry composition for use in forming foundry moulds or cores comprises an aggregate mixed with a binder which includes a polyisocyanate, a polyfunctional phenol and an aliphatic polyol with the weight of the phenol exceeding that of the polyol. The composition may be used in a "cold-box" process.

12 Claims, No Drawings

FOUNDRY BINDERS

BACKGROUND OF THE INVENTION

This invention relates to a foundry composition from which foundry moulds or cores are to be formed.

In U.S. Pat. No. 3,925,296 there is claimed a foundry binder composition comprising a polyisocycanate and a bisphenol. In the process disclosed in the patent, a foundry aggregate is mixed with a binder, formed to the required shape and the mixture is then cured by passing triethylamine through the shaped mixture. I have found that the strength of cores formed by this method and using a binder comprising a polyisocyanate and bisphenol-A decreases over a period following curing and that this decrease in strength is such as to make the method unsuitable for foundry use.

I have further discovered that this disadvantage can be reduced or overcome by modifying the binder composition used in the method.

SUMMARY OF THE INVENTION

According to the invention there is provided a foundry composition comprising a foundry aggregate, a polyisocyanate, a polyfunctional phenol and an aliphatic polyol, wherein the weight of the phenol exceeds that of the polyol. By a polyfunctional phenol is meant a substance having two or more —OH groups attached directly to carbon atoms in the same aromatic ring or in respective aromatic rings which are linked together. By an aliphatic polyol is meant a substance wherein two or more —OH groups are attached to aliphatic carbon atoms in a molecule or chain.

In the preferred composition, the phenol is bisphenol-A, the polyol is a polyether polyol and the weight of the polyol is within the range 5% to 7% of the weight of the phenol.

The polyisocyanate is preferably modified by reacting some of the NCO groups with a drying oil.

DESCRIPTION OF THE PREFERRED EMBODIMENT

In one example of a method of producing a foundry core which involves use of a binder composition in accordance with the invention, there is made up a polyhydroxy composition having the following composition by weight:
bisphenol-A: 50%
polyether polyol: 3%
solvent: 47%

To assist the process of dissolving the bisphenol-A, the three constituents are warmed and stirred together until a clear solution is obtained.

The particular polyol used is a polyether polyol sold under the designation G 600 by Lankro Chemicals Limited of Eccles, England. The solvent used is 2-ethoxy ethylacetate.

A polyisocyanate modified by raw linseed oil is prepared in the following manner. A mixture of the polyisocyanate and linseed oil is heated to a temperature of approximately 145° C. for approximately fifteen minutes. The mixture is then cooled and a solvent is added. The amounts used are such that the proportions, by weight, in the modified polyisocyanate solution are as follows:
polyisocyanate: 67.5%
raw linseed oil: 22.5%
solvent: 10%

The polyisocyanate used is an aromatic polyisocyanate sold by I.C.I. Chemicals Limited, England under the designation EDP 6503. This is of the diphenyl methane di-isocyanate type. The linseed oil is supplied by British Oil and Cake Mills Limited. The solvent is a petroleum fraction sold by Esso Chemicals Limited under the designation Solvesso 100.

The polyhydroxy composition and the modified poly-isocyanate solution are mixed together with foundry sand, the weight of di-isocyanate solution being twice that of the polyhydroxy composition. The mixture is charged into a core box and formed to the required shape. A tertiary amine in gaseous form is then passed through the core box for a few seconds, after which the core box is purged by an inert gas. The core is then cured sufficiently for it to be removed from the core box.

The binder may be mixed with the sand by either a continuous mixing process or a batch mixing process, since the mixture of binder and sand has a bench life under normal conditions of temperature and humidity of at least one or two hours. The amount of binder used with a given weight of sand depends upon factors which include the required core strength and the character of the sand and may be similar to the amounts of known cold setting binders which are used in foundries at the present time.

I have found that, with a binder comprising the particular polyhydroxy composition and modified polyisocyanate solution described, the relationship between the weight of aliphatic polyol used and the weight of bisphenol-A has an important effect on the ability of the core to maintain or even increase its strength over a period of several days following curing. The weight of aliphatic polyol is preferably within the range 5% to 7% of the weight of bisphenol-A and the optimum value is 6% of the weight of bisphenol-A. The particular aliphatic polyhydroxy compound used has an hydroxyl value of 280.

Various catalysts listed in the book "Polyurethanes: Chemistry and Technology" by Saunders and Frisch, published by Wiley in 1962 may be used to catalyse the reaction between the isocyanate and the polyhydroxy composition. Whilst it is convenient to pass through the shaped composition a gaseous catalyst, liquid and/or solid catalysts which are mixed in the composition before the composition is shaped may be used.

The polyisocyanate may comprise di- and/or trifunctional isocyanates. Commerically available mixtures of these may be used. Alternatively, polyisocyanates containing more than three functional groups may be used.

I claim:

1. A foundry composition from which a foundry mould or core is formed, the composition comprising a foundry aggregate, a polyisocyanate, a polyfunctional phenol and an aliphatic polyol having more than two—OH groups, wherein the weight of the polyol is within the range 5% to 7% of the weight of the polyfunctional phenol.

2. A composition according to claim 1 wherein the phenol is bisphenol-A, the polyol is a polyether polyol and the weight of the polyol is within the range 5% to 7% of the weight of the phenol.

3. A composition according to claim 1 wherein the polyisocyanate is modified with a drying oil.

4. A composition according to claim 2 wherein the polyisocyanate is modified with a drying oil.

5. A composition according to claim 1, wherein the polyol is a polyether polyol.

6. A composition according to claim 1, wherein the polyisocyanate is an aromatic polyisocyanate.

7. A composition according to claim 3, wherein the polyisocyante is an aromatic polyisocyanate.

8. A composition according to claim 4, wherein said oil is raw linseed oil.

9. A composition according to claim 3, wherein said oil is raw linseed oil.

10. A composition according to claim 1 further comprising a solvent.

11. A composition according to claim 4, wherein said composition further comprises a solvent.

12. A composition according to claim 11, wherein said solvent is 2-ethoxy ethylacetate.

* * * * *